Patented June 20, 1944

UNITED STATES PATENT OFFICE 2,351,860

RUBBER COMPOSITION AND METHOD OF MAKING SAME

John H. Kelly, Jr., and Milton M. Stern, Chicago, Ill., assignors to Dryden Rubber Company, Chicago, Ill., a corporation of Illinois No Drawing. Application October 20, 1941, Serial No. 415,776

3 Claims. (Cl. 260—5)

The invention relates to rubber compositions and more particularly to oil resistant compositions obtained by reacting rubber with a nitro compound and vulcanizing the reaction product so obtained with a polysulfide.

In one form of the invention, a mixture of comminuted vulcanized rubber scrap and a nitroparaffin is heated to give a millable, vulcanizable reclaim, hereinafter called a nitro reclaim. The nitro reclaim is then mixed with an aryl guanidine polysulfide and an oil resistant synthetic rubber such as neoprene or Perbunan. This composition is heated to bring about a vulcanization reaction between the nitro reclaim and the polysulfide. The product so obtained has about the same oil resistance as the neoprene or Perbunan by itself, and the vulcanized nitro reclaim also acts as an extender for the neoprene or Perbunan. An oil resistant composition of reduced cost is thus obtained in which a portion of the relatively expensive and difficult to obtain synthetic rubber is replaced by an inexpensive oil resistant composition which has for its base the relatively cheap and easily available material, vulcanized rubber scrap.

In carrying out the process, the rubber (preferably vulcanized rubber) is reacted with a nitro compound by heating the mixture at a temperature above normal room temperature. The exact mechanism of the action is not known at present but analysis shows that the resulting product has an increase in nitrogen content. Apparently an $NO_2$ group is attached to the rubber molecule in some manner, and for this reason we refer to the reaction product as a nitro rubber or a nitro reclaim. It is also believed that oxidation of the rubber hydrocarbon and to some extent that of the free and combined sulfur content occurs during the reaction between the nitro compound and the vulcanized rubber.

The reaction of nitro compounds with vulcanized rubber to produce a nitro reclaim may be carried out with various proportions of nitro compounds to vulcanized rubber and under a wide range of temperature conditions and time of heating. Depending upon the proportions, temperature and time of heating, the product will vary from soft rubber-like products to extremely hard brittle resin-like material. All these products show reactivity towards polysulfides and produce products of greater oil resistance than may be obtained by an ordinary reclaim with a polysulfide or by reacting a nitro reclaim with sulfur which is not present in a polysulfide compound. In general, any mixture of rubber (preferably vulcanized rubber) and a nitro compound (preferably a nitroparaffin) is heated for a time and temperature such as to produce a millable, vulcanizable product, care being taken that the time and temperature is not so great as to cause the mix to enflame and produce charring and blackening of the product.

Any type of nitro compound may be used in the process, including the nitro aromatic compounds such as nitro benzene, nitro toluene and nitro phenol. However, we prefer to use the nitroparaffin compounds in our process.

The reaction of comminuted vulcanized rubber with nitroparaffins takes place readily without fusion, and a comminuted product may be obtained after the reaction. During heating of vulcanized rubber with nitro aromatic fusion and dissolution of the rubber occurs much more readily than with the nitroparaffins. Furthermore, it is much easier to produce non-tacky reclaims with the nitroparaffin reclaims than with the nitro aromatics. The excess nitroparaffin is also more easily removed than the nitro aromatics, and there are other advantages. However, oil resistant compositions may be obtained by reacting the nitro aromatic reclaims with a polysulfide.

The primary nitroparaffins such as nitromethane, nitroethane, 1-nitropropane and 2-nitropropane are extremely effective. Similarly so we find the various derivatives such as nitrohydroxy derivatives, the mono- or poly-halogen compounds, the reaction products of notroparaffins and cyclic aldehydes, and also the products formed from reacting chloronitroparaffins and the alkali salt of a nitroparaffin such as 2-chloro 2-nitroethane and sodium nitromethane. The latter forms dinitro compounds as does that condensation of nitromethane with acetone to form 2-2-dimethyl-1-3-dinitro propane. Such compounds as 2-nitro-1 butanol, 2-nitro-2-methyl-1-propanol, 2-nitro-2-methyl-1-3 propanediol, 2-nitro-2-ethyl-1-3-propandiol, tris (hydroxymethyl) nitromethane—all nitrohydroxy compounds function as effectively as do the chlorinated compounds such as 2-chloro-2-nitropropane, etc. We find, in general, irrespective of the nitro compound used, satisfactory results are obtained—whether primary, secondary, the chlorinated derivatives thereof, chlorinated nitrohydroxy compounds, nitro alcohols, esters of nitro alcohols, etc. Mixtures of the various nitroparaffins can be used.

Suitable vulcanized rubber is vulcanized scrap rubber such as tire peelings, hose belting and mechanical scrap, cured spone waste, scrap inner tubes, etc. This may be ground, shredded or otherwise comminuted before subjecting to the reclaiming process. This waste vulcanized scrap is preferably ground to a fineness of not less than twenty mesh. In our process, we have found that the finer particles such as those passing through either forty or sixty mesh screen give a more uniform reaction.

The proportion of nitroparaffin to vulcanized scrap may vary widely. Suitable proportions may be three to twenty-five per cent of the nitroparaffin based on the vulcanized rubber. From fifteen to twenty-five percent is a highly effective proportion when the nitro compound is mixed with the waste comminuted vulcanized scrap before placing the mixture in the heater. Alternatively, instead of mixing the nitroparaffin with the vulcanized scrap in liquid or solid form, the comminuted vulcanized scrap may be contacted with the vapors of nitroparaffin which can be continuously circulated over and through the comminuted vulcanized scrap during the reaction.

The temperatures used in the process may be varied widely. When lower temperatures, for example 50° C., are used, the time required to convert the vulcanized scrap to the desired condition is longer than desirable. Preferred temperatures are from 100° C. to 180° C. At these temperatures, the reclaiming process is completed in from about two to three hours and a plastic, cohesive and vulcanizable product obtained. Longer periods of time may be used, in which case the product becomes harder and more brittle.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example I*

100 lbs. of vulcanized red inner tube scrap, finely ground to pass a 40 mesh screen, were mixed and intimately blended with 5 lbs. of powdered 2-nitro-2-methyl-1-3-propanediol. The mixture was spread 2 inches deep in shallow trays and placed in a jacketed vulcanizer. Sufficient steam was led through the jacket to create a temperature of 150° C. inside the heater. At the end of 180 minutes, a product was obtained which was plastic and cohesive but comparatively free of the fluidifying degradation obtained with ordinary tube scrap subjected to the same temperature in the absence of the nitroparaffin. The nitroparaffin reclaim was then placed on refiner rolls set to .005 in. to .010 in. and given at least five passes through these rolls and then made into slabs.

*Example II*

Span ground vulcanized inner tube scrap, span ground to pass through a 60 mesh screen, was spread in shallow trays and placed in a suitable pressure vessel. 1-nitropropane was placed in a separate heating vessel connected to the vessel containing the scrap. The scrap was heated to about 150° C. and the nitropropane also heated to about 150° C. and the gaseous vapors of the nitropropane circulated continuously through the vulcanized scrap by means of a suitable pump. At the end of three hours, the nitropropane was removed from contact with the scrap, leaving a nitro reclaim substantially free of unreacted nitropropane.

*Example III*

The nitropropane reclaim made in accordance with Example II was homogenized or refined. After completing this operation, it was compounded with neoprene and tested against a similar neoprene mix containing a standard alkali red inner tube reclaim. A control, using straight neoprene, was also mixed and tested.

(The amounts given in the following examples are parts by weight.)

|  | A | B | C |
|---|---|---|---|
| Neoprene | 100 | 100 | 100 |
| Nitropropane tube reclaim | 100 | | |
| Alkali inner tube reclaim | | 100 | |
| Magnesium oxide | 5 | 5 | 5 |
| Zinc oxide | 5 | 5 | 5 |
| Sulfur | | 2 | |
| Agerite gel | 1 | 1 | 1 |
| Diphenylguanidine tetrasulfide | 25 | 25 | |

All compounds were vulcanized 30 minutes at 60 lbs. steam pressure.

The alkali red inner tube reclaim compound B included sulfur as it was necessary to obtain a firm tight snappy cure to equal that existing in compound A.

Result of testing in hot kerosene at 70° C. for 24 hours gave the following data:

|  | A | B | C |
|---|---|---|---|
| Increase in weight per cent | 13.7 | 22.7 | 14.2 |
| Increase in volume do | 22.4 | 35.4 | 22.5 |

It will be observed the nitropropane reclaim mixture gave the same oil resistance as did the control, while the alkali tube reclaim mix appreciably differed from either control or nitropropane reclaim compound.

*Example IV*

Ground tire peelings were treated, as in Example II, refined and mixed, as follows:

Parts by weight
Neoprene _____ 100
Nitropropane tire reclaim _____ 100
Magnesium oxide _____ 5
Zinc oxide _____ 5
Agerite gel _____ 2
Diphenylguanidinetetrasulfide _____ 25

These test slabs were vulcanized 30 minutes at 60 lbs. steam pressure. Oil immersion tests gave the following:

Per cent
Increase in weight _____ 6.9
Increase in volume _____ 10.0

*Example V*

The 2-nitro-2-methyl-1-3-propane diol reclaim made in accordance with Example 1 was compounded and tested with Hycar, a modified butadiene copolymer. A similar mixture with an alkali red inner tube reclaim and a control mix were also tested in kerosene at 70° C.

|  | A | B | C |
|---|---|---|---|
| Hycar | 100 | 100 | 100 |
| Nitro-methyl-propane-diol reclaim | 100 | | |
| Alkali inner tube reclaim | | 100 | |
| Benzothiazyl disulfide | 1 | 1 | 1 |
| Stearic acid | 1 | 1 | 1 |
| Zinc oxide | 5 | 5 | 5 |
| Sulfur | 1 | 1 | 1 |
| Agerite gel | 1 | 1 | 1 |
| Diphenylguanidinetetrasulfide | 25 | 25 | 25 |

The hot oil immersion tests gave the following interesting comparison of test slabs vulcanized 20 minutes at 60 lbs. steam pressure.

|  | A | B | C |
|---|---|---|---|
| Increase in weight | 2.7 | 19.8 | 1.3 |
| Increase in volume | 4.3 | 28.6 | 2.1 |

If compounds A and B were mixed and cured without the diphenylguanidinetetrasulfide, results after oil immersion tests would average:

|  | A | B |
|---|---|---|
| Increase in weight | 8.3 | 43.4 |
| Increase in volume | 12.8 | 58.8 |

The reactivity of nitroparaffin reclaims with suitable polysulfide is pronounced and increased oil resistance is observed in the above comparisons whenever the polysulfide is incorporated into the mix.

Example VI

The nitropropane reclaims made in accordance with Example II and Example IV were compounded as follows with Hycar:

|  | A | B | C |
|---|---|---|---|
| Hycar | 100 | 100 | 100 |
| Nitropropane tube reclaim | 100 |  |  |
| Nitropropane tire reclaim |  | 100 |  |
| Benzothiazyl disulfide | 1 | 1 | 1 |
| Stearic acid | 1 | 1 | 1 |
| Zinc oxide | 5 | 5 | 5 |
| Sulfur | 1 | 1 | 1 |
| Agerite gel | 1 | 1 | 1 |
| Diphenylguanidine tetrasulfide | 25 | 25 |  |

Test slabs were vulcanized 20 minutes at 60 lbs. steam pressure. The oil immersion tests provided the following results:

|  | A | B | C |
|---|---|---|---|
| Increase in weight_____per cent__ | 5.5 | 2.0 | 1.3 |
| Increase in volume_____do____ | 7.6 | 3.1 | 2.1 |

Example VII

The nitroparaffin reclaims made in accordance with Example II and Example IV were compounded with Perbunan, a copolymer of butadiene and acrylonitrile. All oil resistant butadiene copolymer elastomers behave similarly with the nitroparaffin reclaims, and the following compounds are typical:

|  | A | B | C |
|---|---|---|---|
| Perbunan | 100 | 100 | 100 |
| Nitropropane tube reclaim | 100 |  |  |
| Nitropropane tire reclaim |  | 100 |  |
| Benzothiazyl disulfide | 1.25 | 1.25 | 1.25 |
| Stearic acid | 1.25 | 1.25 | 1.25 |
| Zinc oxide | 5.00 | 5.00 | 5.00 |
| Sulfur | 1.25 | 1.25 | 1.25 |
| Agerite gel | 1.00 | 1.00 | 1.00 |
| Diphenylguanidinetetrasulfide | 25 | 25 |  |

Hot kerosene tests at 70° C. gave the following:

|  | A | B | C |
|---|---|---|---|
| Increase in weight | 12.5 | 4.3 | 5.3 |
| Increase in volume | 17.2 | 6.6 | 9.1 |

It will be observed the nitropropane tube reclaim compound A gave somewhat high absorption in comparison to B and C compounds, but such increase is far below the so-called danger point.

Example VIII 10 parts by weight of M-nitrobenzene were mixed with 100 parts by weight of finely comminuted vulcanized scrap (14 mesh) and the mixture heated 3 hours at 310° F. The product obtained was a cohesive plastic mix differing from the product generally obtained with the nitroparaffins in that the composition was softer, more tacky and a unitary mass instead of being separate particles.

The above nitro reclaim was refined and compounded as follows:

| | Parts by weight |
|---|---|
| Nitrobenzene reclaim | 100 |
| Neoprene | 100 |
| Diphenylguanidinetetrasulfide | 25 |
| Magnesium oxide | 5 |
| Zinc oxide | 5 |
| Agerite gel | 1 |

Test slabs of the above composition were vulcanized 30 minutes at 60 lbs. steam pressure. The vulcanized slabs were immersed in kerosene for 3 hours at 70° C. and the following results were obtained:

| | |
|---|---|
| Increase in weight | 12.0 |
| Increase in volume | 19.2 |

The diphenylguanidinetetrasulfide used in the above examples is a complex mixture obtained by reacting 4 mols of sulfur with 1 mol of diphenylguanidine by heating 20 minutes at 200° C. or until both frothing and gas evolution cease. It acts as a so-called catalyst with oxidized or nitro reclaim and permits extremely high oil resistance. The precise reaction phenomena is not yet clearly understood.

Other methods of preparing these polysulfides are equally effective—blowing air continuously through the molten diphenylguanidine sulfur mixture results in much more homogenous sulfides. For example, aerating continuously the mixture of 1 mol of diphenylguanidine and 4 mols of sulfur leads to a brittle brown resin if temperatures do not exceed 240° C. On the other hand, the elimination of aerating and actively refluxing the mixture instead, results in products more or less plastic, owing to the existence of large amounts of aniline and other decomposition products of the reaction. Irrespective of how the fusion polysulfide is prepared, improved oil resistance is created when these polysulfides are incorporated into nitro reclaims or in mixtures of these with various synthetic rubberlike polymers or even with natural crude rubber itself after vulcanization.

In place of diphenylguanidine polysulfides other polysulfides may be used. In general, any type of polysulfide compound will give compositions of improved oil resistance when compounded with nitro reclaims and then heated to bring about a vulcanization or reaction. Any substantial amount of polysulfide compound with a nitro reclaim will give increased oil resistance, but in order to obtain oil resistance of the order of that obtained with neoprene and similar oil resistant rubbers, the amount of the sulfide sulfur of the polysulfide compound should be at least 5% and preferably above 10% by weight on the basis of the nitro rubber. In general, the amount of polysulfide compound should not exceed the weight of the rubber.

The following polysulfide compounds have been found suitable in the practice of this invention:

Sodium polysulfide
Urea polysulfide
Dicyandiamide polysulfide
Diphenylguanidine polysulfide
Triphenylguanidine polysulfide
Di.-o-Tolyl guanidine polysulfide
Tetramethyl thiuram polysulfide
Tetraethyl thiuram polysulfide
Diazo amino benzene thiuram polysulfide The preferable polysulfides are the aryl guanidine polysulfides, including diphenyl and triphenyl tetrasulfides. It has been found that these types of compounds give high oil resistance when mixed with all types of vulcanizable rubber and the composition vulcanized in the ordinary manner of vulcanizing rubber. This increase in oil resistance takes place with all types of reclaims, although superior results are obtained with the nitro reclaims. It also occurs when the polysulfide is heated with crude rubber. To obtain appreciable oil resistance with the aryl guanidine polysulfides, the polysulfides should be present in above the amounts used for vulcanization accelerators; above 10% and preferably above 20% based on the weight of the rubber. With crude rubber a composition containing 50% to 75% of diphenylguanidinetetrasulfide on the rubber gives oil resistance which favorably compares to that of neoprene, Perbunan and like oil resistant synthetic rubbers now on the market.

The nitro reclaims are also valuable as extenders and softeners for synthetic rubber or elastomers including neoprene, the alkyl dihalogen polysulphide rubber-like condensation products such as Thiokol, and the various butadiene copolymers including Butyl rubber, Hycar, and the copolymer of butadiene and styrene and the copolymer of butadiene and acrylonitrile. Contrasted with synthetic rubber mixtures containing ordinary reclaim the vulcanization of synthetic rubber mixtures containing these nitro reclaims results in extremely good oil resistance, even when sulfur (without a polysulphide) is used as a vulcanizing agent, but superior results are obtained with polysulphide vulcanizing agents. For oil resistance which compares favorably to the synthetic polymers such as neoprene and Perbunan a polysulfide should be used in such proportion that the sulfide sulfur content of the polysulfide is at least 5% on the weight of the nitro reclaim and preferably above 10%.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

We claim:

1. The method of extending an oil resistant synthetic rubber selected from the group consisting of polychloroprene, polyalkylene polysulphide, and butadiene-acrylonitrile copolymer, which comprises mixing with said synthetic rubber a vulcanizable natural rubber and from 10% to 100% of an aryl guanidine polysulphide based on the weight of the natural rubber, and heating the mixture under vulcanizing conditions.

2. The method of extending an oil resistant synthetic rubber selected from the group consisting of polychloroprene, polyalkylene polysulphide, and butadiene-acrylonitrile copolymer, which comprises mixing with said synthetic rubber an aryl guanidine polysulphide and a millable vulcanizable reclaim obtained by treating a waste rubber with a nitroparaffine, said aryl guanidine polysulphide being present in from about 10% to 100% of the weight of the reclaim.

3. The method of extending an oil resistant butadiene-acrylonitrile copolymer synthetic rubber which comprises mixing with said butadiene-acrylonitrile copolymer synthetic rubber a vulcanizable natural rubber and from 10% to 100% of a phenyl guanidine polysulphide based on the weight of the natural rubber, and heating the mixture under vulcanizing conditions.

JOHN H. KELLY, Jr.
MILTON M. STERN.